(12) United States Patent
Beaumier et al.

(10) Patent No.: US 11,989,048 B2
(45) Date of Patent: *May 21, 2024

(54) SYSTEMS AND/OR METHODS FOR MONITORING AUDIO INPUTS TO JUKEBOX DEVICES

(71) Applicant: TouchTunes Music Company, LLC, New York, NY (US)

(72) Inventors: Francois Beaumier, Montreal (CA); Michael Tooker, Pointe Claire (CA)

(73) Assignee: TOUCHTUNES MUSIC COMPANY, LLC, New York, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 17/481,460

(22) Filed: Sep. 22, 2021

(65) Prior Publication Data
US 2022/0004601 A1  Jan. 6, 2022

Related U.S. Application Data

(63) Continuation of application No. 13/346,600, filed on Jan. 9, 2012, now Pat. No. 11,151,224.

(51) Int. Cl.
G06F 21/10        (2013.01)
(52) U.S. Cl.
CPC .................................. G06F 21/10 (2013.01)
(58) Field of Classification Search
CPC ....................................................... G06F 21/10
See application file for complete search history.

(56) References Cited

U.S. PATENT DOCUMENTS 3,710,137 A   1/1973 Stephens, Jr.
3,807,541 A   4/1974 Kortenhaus
(Continued)

FOREIGN PATENT DOCUMENTS

AU   199954012   4/2000
CA   2119184     9/1994
(Continued)

OTHER PUBLICATIONS

Merriam Webster's Collegiate Dictionary, Ninth Edition, Merriam Webster, Inc., p. 1148, 1986 (definition of "Stand").
(Continued)

*Primary Examiner* — Maung T Lwin
*Assistant Examiner* — Suman Debnath
(74) *Attorney, Agent, or Firm* — NIXON & VANDERHYE, P.C.

(57) ABSTRACT

Certain exemplary embodiments relate to techniques for detecting unlicensed music on a digital jukebox device. A monitoring module, system, subsystem or the like determines whether audio is being provided to the digital jukebox device from an external source for reproduction via a speaker system connected to the jukebox device in place of jukebox media available directly to the jukebox device. When audio is being provided from the external source: at least a portion of the audio being provided to the digital jukebox device from the external source for reproduction via the jukebox device is captured; it is detected whether the captured portion corresponds to audio content that should be licensed; and a log of possible license violations is updated as appropriate. A notification concerning the log of possible violations is generated when a number of possible violations meets or exceeds a predetermined threshold in a predetermined time period.

26 Claims, 5 Drawing Sheets

(56) References Cited

U.S. PATENT DOCUMENTS

| | | |
|---|---|---|
| 3,982,620 A | 9/1976 | Kotenhaus |
| 4,008,369 A | 2/1977 | Theurer et al. |
| 4,064,362 A | 12/1977 | Williams |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt et al. |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,696,527 A | 9/1987 | Ding et al. |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,815,868 A | 3/1989 | Speicher |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| D327,687 S | 7/1992 | Arbitor |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| D332,096 S | 12/1992 | Wolff et al. |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | Sansoucie |
| 5,375,206 A | 12/1994 | Hunter |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whistler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |

(56) References Cited

U.S. PATENT DOCUMENTS

| | | |
|---|---|---|
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,590,318 A | 12/1996 | Zbikowski et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,704,146 A | 1/1998 | Herring et al. |
| 5,708,811 A | 1/1998 | Arendt |
| 5,712,976 A | 1/1998 | Falcon et al. |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos et al. |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |

(56) References Cited

U.S. PATENT DOCUMENTS

| | | |
|---|---|---|
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,005 A | 9/1999 | Liu |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,014,354 A | 1/2000 | Biliris et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,026,168 A | 2/2000 | Li et al. |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,067,564 A | 5/2000 | Urakoshi et al. |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,146,210 A | 11/2000 | Cha et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,167,358 A | 12/2000 | Othmer et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |
| 6,359,661 B1 | 3/2002 | Nickum |
| 6,370,580 B2 | 4/2002 | Kriegsman |
| 6,379,187 B2 | 4/2002 | Nishimatsu |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | Mcguire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |

(56) References Cited

U.S. PATENT DOCUMENTS

| | | |
|---|---|---|
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| D495,755 S | 9/2004 | Wurz et al. |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,160,132 B2 | 1/2007 | Phillips et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| D560,651 S | 1/2008 | Berkheimer et al. |
| 7,347,723 B1 | 3/2008 | Daily |
| D566,195 S | 4/2008 | Ichimura et al. |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,522,631 B1 | 4/2009 | Brown et al. |
| 7,533,182 B2 | 5/2009 | Wurtzel et al. |
| 7,549,919 B1 | 6/2009 | Nathan et al. |
| 7,574,727 B2 | 8/2009 | Nathan et al. |
| 7,634,228 B2 | 12/2009 | White et al. |
| 7,647,613 B2 | 1/2010 | Drakoulis et al. |
| 7,657,910 B1 | 2/2010 | McAulay et al. |
| 7,672,873 B2 | 3/2010 | Kindig |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| 7,937,724 B2 | 5/2011 | Clark et al. |
| 7,987,282 B2 | 7/2011 | Nathan et al. |
| D642,553 S | 8/2011 | Nathan et al. |
| 7,992,178 B1 | 8/2011 | Nathan et al. |
| 7,996,438 B2 | 8/2011 | Mastronardi et al. |
| 7,996,873 B1 | 8/2011 | Nathan et al. |
| 8,015,200 B2 | 9/2011 | Seiflien et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,103,589 B2 | 1/2012 | Nathan et al. |
| 8,127,324 B2 | 2/2012 | Nathan et al. |
| 8,145,547 B2 | 3/2012 | Nathan et al. |
| 8,151,304 B2 | 4/2012 | Nathan et al. |
| 8,165,318 B2 | 4/2012 | Nathan et al. |
| 8,184,508 B2 | 5/2012 | Nathan et al. |
| 8,189,819 B2 | 5/2012 | Nathan et al. |
| 8,214,874 B2 | 7/2012 | Nathan |
| 8,225,369 B2 | 7/2012 | Nathan et al. |
| D665,375 S | 8/2012 | Garneau et al. |
| 8,275,668 B2 | 9/2012 | Nathan et al. |
| 8,292,712 B2 | 10/2012 | Nathan et al. |
| 8,325,571 B2 | 12/2012 | Cappello et al. |
| 8,332,887 B2 | 12/2012 | Dion et al. |
| 8,332,895 B2 | 12/2012 | Nathan et al. |
| 8,428,273 B2 | 4/2013 | Nathan et al. |
| 8,429,530 B2 | 4/2013 | Neuman et al. |
| 8,469,820 B2 | 6/2013 | Nathan et al. |
| 8,473,416 B2 | 6/2013 | Brillon et al. |
| 8,479,240 B2 | 7/2013 | Nathan et al. |
| 8,495,109 B2 | 7/2013 | Nathan et al. |
| 8,661,477 B2 | 2/2014 | Nathan et al. |
| 8,683,541 B2 | 3/2014 | Nathan et al. |
| 8,719,873 B2 | 5/2014 | Nathan et al. |
| 8,724,436 B2 | 5/2014 | Nathan et al. |
| 8,726,330 B2 | 5/2014 | Nathan et al. |
| 8,739,206 B2 | 5/2014 | Dion et al. |
| 8,751,611 B2 | 6/2014 | Nathan et al. |
| 8,843,991 B2 | 9/2014 | Nathan et al. |
| 8,849,435 B2 | 9/2014 | Dion et al. |
| 9,171,419 B2 | 10/2015 | Dion et al. |
| 9,330,529 B2 | 5/2016 | Fedesna et al. |
| 9,521,375 B2 | 12/2016 | Beaumier et al. |
| 9,646,339 B2 | 5/2017 | Nathan et al. |
| 9,953,481 B2 | 4/2018 | Tooker et al. |
| 10,127,759 B2 | 11/2018 | Mastronardi et al. |
| 10,290,006 B2 | 5/2019 | Straus et al. |
| 10,373,420 B2 | 8/2019 | Dion et al. |
| 11,049,083 B2 | 6/2021 | Nathan et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1* | 1/2002 | Martin ............ A63F 13/90 |
| 2002/0002483 A1 | 1/2002 | Siegel et al. |
| 2002/0018074 A1 | 2/2002 | Buil et al. |
| 2002/0032603 A1 | 3/2002 | Yeiser |
| 2002/0040371 A1 | 4/2002 | Burgess |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0123331 A1 | 9/2002 | Lehaff et al. |
| 2002/0126141 A1 | 9/2002 | Mastronardi |
| 2002/0129036 A1 | 9/2002 | Ho Yuen Lok et al. |
| 2002/0162104 A1 | 10/2002 | Raike et al. |

(56) References Cited

U.S. PATENT DOCUMENTS

| | | |
|---|---|---|
| 2003/0004833 A1 | 1/2003 | Pollak et al. |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0014272 A1 | 1/2003 | Goulet et al. |
| 2003/0018740 A1 | 1/2003 | Sonoda et al. |
| 2003/0027120 A1 | 2/2003 | Jean |
| 2003/0031096 A1 | 2/2003 | Nathan et al. |
| 2003/0037010 A1 | 2/2003 | Schmelzer |
| 2003/0041093 A1 | 2/2003 | Yamane et al. |
| 2003/0050058 A1 | 3/2003 | Walsh et al. |
| 2003/0064805 A1 | 4/2003 | Wells |
| 2003/0065639 A1 | 4/2003 | Fiennes et al. |
| 2003/0076380 A1 | 4/2003 | Yusef et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0144910 A1 | 7/2003 | Flaherty et al. |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee et al. |
| 2004/0010800 A1 | 1/2004 | Goci |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2004/0243482 A1 | 12/2004 | Laut |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen et al. |
| 2006/0062094 A1 | 3/2006 | Nathan et al. |
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0293773 A1 | 12/2006 | Nathan et al. |
| 2007/0025701 A1 | 2/2007 | Kawasaki et al. |
| 2007/0047198 A1 | 3/2007 | Crooijmans et al. |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0247979 A1 | 10/2007 | Brillon et al. |
| 2008/0003881 A1 | 1/2008 | Wu |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0239887 A1 | 10/2008 | Tooker et al. |
| 2008/0275771 A1 | 11/2008 | Levine |
| 2008/0305738 A1 | 12/2008 | Khedouri et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0100092 A1 | 4/2009 | Seiflein et al. |
| 2009/0138111 A1 | 5/2009 | Mastronardi |
| 2009/0168901 A1 | 7/2009 | Yarmolich et al. |
| 2009/0172565 A1 | 7/2009 | Jackson et al. |
| 2009/0177301 A1 | 7/2009 | Hayes |
| 2009/0240721 A1 | 9/2009 | Giacalone |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0298577 A1 | 12/2009 | Gagner et al. |
| 2009/0307314 A1 | 12/2009 | Smith et al. |
| 2009/0328095 A1 | 12/2009 | Vinokurov et al. |
| 2010/0042505 A1 | 2/2010 | Straus |
| 2010/0131558 A1* | 5/2010 | Logan ............... G06Q 50/184 705/310 |
| 2010/0198636 A1* | 8/2010 | Choudhary ......... G06F 21/552 726/1 |
| 2010/0211818 A1 | 8/2010 | Nathan et al. |
| 2010/0241259 A1 | 9/2010 | Nathan |
| 2010/0247081 A1 | 9/2010 | Victoria Pons |
| 2010/0269066 A1 | 10/2010 | Nathan |
| 2010/0279775 A1 | 11/2010 | Nathan et al. |
| 2010/0299232 A1 | 11/2010 | Nathan et al. |
| 2010/0306179 A1* | 12/2010 | Lim .................. G06F 16/176 707/688 |
| 2011/0055019 A1 | 3/2011 | Coleman |
| 2011/0066943 A1 | 3/2011 | Brillon et al. |
| 2011/0160885 A1* | 6/2011 | Itskov ................ H04H 20/61 700/94 |
| 2011/0173521 A1 | 7/2011 | Horton et al. |
| 2011/0208335 A1 | 8/2011 | Nathan et al. |
| 2011/0246517 A1 | 10/2011 | Nathan et al. |
| 2011/0283236 A1 | 11/2011 | Beaumier et al. |
| 2011/0298938 A1 | 12/2011 | Nathan et al. |
| 2011/0304685 A1 | 12/2011 | Khedouri et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |
| 2012/0146684 A1* | 6/2012 | Ebbers ................ G06F 21/87 326/8 |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2012/0276865 A1 | 11/2012 | Wang |
| 2012/0323652 A1 | 12/2012 | Mastronardi et al. |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0067512 A1 | 3/2013 | Dion et al. |
| 2013/0070093 A1 | 3/2013 | Rivera et al. |
| 2013/0091054 A1 | 4/2013 | Nathan et al. |
| 2013/0179980 A1 | 7/2013 | Nathan et al. |
| 2014/0026154 A1 | 1/2014 | Nathan |
| 2014/0108106 A1 | 4/2014 | Nathan et al. |

FOREIGN PATENT DOCUMENTS

| | | |
|---|---|---|
| CN | 1340939 | 3/2002 |
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19539172 | 9/1996 |

(56) References Cited

FOREIGN PATENT DOCUMENTS

| | | |
|---|---|---|
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 | 7/1997 |
| EP | 0786124 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2238680 | 6/1991 |
| GB | 2254469 | 10/1992 |
| GB | 2259398 | 3/1993 |
| GB | 2262170 | 6/1993 |
| GB | 2193420 | 2/1998 |
| GB | 2380377 | 4/2003 |
| GB | 2505584 | 8/2014 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 06-127885 | 5/1994 |
| JP | 07281682 | 10/1995 |
| JP | 07-311587 | 11/1995 |
| JP | 08-037701 | 2/1996 |
| JP | 8274812 | 10/1996 |
| JP | 08279235 | 10/1996 |
| JP | 08289976 | 11/1996 |
| JP | 928918 | 2/1997 |
| JP | 9114470 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-003088 | 1/1999 |
| JP | 11-024686 | 1/1999 |
| JP | 11-095768 | 4/1999 |
| JP | 2002-83640 | 3/2002 |
| JP | 2002-537584 | 11/2002 |
| JP | 2003-076380 | 3/2003 |
| JP | 2003-084903 | 3/2003 |
| JP | 2003-099072 | 4/2003 |
| JP | 2005-107267 | 4/2005 |
| JP | 2005-184237 | 7/2005 |
| JP | 2006-048076 | 2/2006 |
| JP | 2007-034253 | 2/2007 |
| JP | 2007-041722 | 2/2007 |
| JP | 2007/505410 | 3/2007 |
| JP | 07504517 | 3/2007 |
| JP | 2007-102982 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-241748 | 9/2007 |
| JP | 2008-058656 | 3/2008 |
| JP | 2009-017529 | 1/2009 |
| JP | 2009-075540 | 4/2009 |
| TW | 514511 | 12/2002 |
| TW | M274284 | 9/2005 |
| TW | M290206 | 5/2006 |
| WO | WO 86/01326 | 2/1986 |
| WO | WO 90/00429 | 1/1990 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO93/21732 | 10/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | 0225610 | 3/2002 |
| WO | WO-0225610 A1 * | 3/2002 ............ G07F 11/002 |
| WO | WO 02/060546 | 8/2002 |
| WO | WO 02/095752 | 11/2002 |
| WO | WO 01/084353 | 1/2003 |
| WO | WO 2003/005743 | 1/2003 |
| WO | WO 03/069613 | 8/2003 |
| WO | WO 2004/029775 | 4/2004 |
| WO | 2005/026916 | 3/2005 |
| WO | WO 2006/014739 | 2/2006 |
| WO | WO 2006/056933 | 6/2006 |
| WO | WO 2006/138064 | 12/2006 |
| WO | WO 2007/092542 | 8/2007 |
| WO | WO 2008-033853 | 3/2008 |
| WO | WO 2011094330 | 8/2011 |
| WO | WO 2013/040603 | 3/2013 |

OTHER PUBLICATIONS

"About Ecast", date unknown, leaflet.

Ahanger et al.; A Digital On-Demand Video Service Supporting Content-Based Queries; 1993; 9 pages.

Austin Cyber Limits: Name That Tune [online], [retrieved Jul. 23, 2001]. Retrieved from the Internet: <http://www.pbs.ork/klru/austin/games/namethattune.html>.

Back to the Tunes [online], [retrieved Jul. 23, 2001]. Retrieved from the Internet: <http://citc5.hispeed.com/rules.html>.

(56) References Cited

OTHER PUBLICATIONS

Bonczek et al, "The DSS Development System", 1983 National Computer Conference, Anaheim, California, May 16-19, 1983, pp. 441-455.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
"Darts Revolution Again", Replay Magazine, Mar. 1991, pp. 146-148.
Decision of the European Patent Office to revoke the related EP Patent No. 786 125, dated Feb. 17, 2005.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10, 2002.
"Ecast Forges Landmark International Technology Partnership", Business Wire at www.findarticles.com/cf_0/m0EIN/2000_July_25/63663604/print.html, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
European Search Report from EP 1 993 079.
European Search Report issued for European Application No. 08000845.1-1238/1962251, dated Apr. 3, 2009.
Fachbuch, "Unterhaltungselektronic von A-Z" gfu 1, VDE-Verlag GmbH, pp. 12-13, 1983-1984.
"Foobar 2000 Evaluation Updated," MonkeyBiz, Aug. 3, 2008, 4 pages (with partial English translation). http://monkeybizinfo.blogspot.jp/2008/08/foobar2000.html.
Gallardo et al., "Tangible Jukebox: back to palpable music", ACM TEI, pp. 199-202, 2010.
Gralla, "How the Internet Works", Millennium Ed., Que Corporation, Aug. 1999.
Grimes, Chapter 18, "Taking Advantage of Web-based Audio".
Hewlett-Packard Development Co; HP Open View Storage Data Protector Admin's Guideline Manual Edition; May 2003; Copyright 2003, 60 pages http://h20000.www2.hp.com/bc/docs/support/SupportManual/c006637931/c00663793.pdf.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No. 1, Jan. 1998, "Safe Mechanism for Installing Operating System Updates with Applications," pp. 557-559.
International Search Report for PCT/US2009/003998, dated Aug. 17, 2009.
International Search Report for PCT/US2010/000799, dated May 11, 2010.
International Preliminary Report on Patentability issued in corresponding International Application No. PCT/US2010/000799 dated Sep. 29, 2011.
International Search Report for PCT/US2011/22598, dated Mar. 29, 2011.
International Search Report and Written Opinion dated Feb. 1, 2013 in corresponding PCT Application No. PCT/US12/55849.
International Preliminary Report on Patentability dated Apr. 10, 2014 in corresponding International Application No. PCT/US2012/055849.
International Search Report for PCT/US2014/24648, dated Sep. 19, 2014.
International Preliminary Report on Patentability dated Jul. 31, 2012 in corresponding Application No. PCT/US2011/0022598.
ITouch 8 Plus brochure, JVL Corporation, 2005, 2 pages.
ITOUCH 27 New Games brochure, JVL Corporation, 2005, 2 pages.
Johnny Rockets Name That Tune [online], [retrieved Mar. 7, 2002]. Retrieved from the Internet: <http://www.johnnyrockets.com/docs/funstuff.html>.
Koskelainem, "Report on Streamworks™".
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Merriam Webster's Collegiate Dictionary, Tenth Edition, Merriam-Webster, Inc., p. 361 (definition of dynamically).
Mickey B's Jukebox Revue—Name That Tune! [online], [retrieved Jul. 23, 2001]. Retrieved from the Internet: <http://mickeyb.com/tune/>.
Mod Box Internet brochure, Merit Entertainment, 2006, 2 pages.
Newsome et al., "Proxy compilation of dynamically loaded java classes with MoJo", ACM LCTES, pp. 204-212, Jun. 2002.
Office Action dated Oct. 1, 2013 in corresponding Japanese Application No. 2012-500786 (with translation).
Office Action dated Jan. 28, 2014 in corresponding Great Britain Application No. 1320224.7.
Office Action dated Jan. 16, 2014 in corresponding Great Britain Application No. 1320224.7.
Office Action dated Mar. 4, 2014 in corresponding Japanese Application No. 2008-079311 (with translation), pp. 1-3.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), Oct. 27 1 JP 07 281682, figure 1-6 abrége.
Peter Pawlowski, "Basic Player Whose Appearance and Functions can be Customized Freely 'Foobar 2000' v1.0 is Unveiled," Windows Forest, Japan, Jan. 12, 2010, 3 pages (with partial English translation). http://forest.impress.co.jp/docs/news/20100112_341870.html.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
Stevens, "TCP/IP Illustrated: vol. 1, the Protocols".
Stewart, "Ecast Deploys Marimba's Castanet to Power an Internet-Based, Entertainment Management System for the Out-of-Home Market", Marimba, Press Release, 3 pages, www.marimba.com/news/releases/ecast.dec13.html, Dec. 13, 1999.
Strauss et al., "Information Jukebox A semi public device for presenting multimedia information content", Pers. Ubiquit Comput, 7, pp. 217-220, 2003.

(56) References Cited

OTHER PUBLICATIONS

Summary of the oral proceedings regarding EP 786 125 before the Opposition Division of the European Patent Office, dated Feb. 17, 2005.
Tom & Liz's Name That Tune [online], [retrieved Jul. 23, 2001]. Retrieved from the Internet: <http://home.att.net/~tomnliz/Music.html>.
U.S. Appl. No. 29/371,355, Garneau et al., filed Dec. 14, 2010.
U.S. Appl. No. 61/536,015, filed Sep. 18, 2011; Rivera et al.
U.S. Appl. No. 29/401,854, filed Sep. 16, 2011; Garneau et al.
U.S. Appl. No. 61/584,750, filed Jan. 9, 2012; Rivera et al.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
Yuki Murata, iTunes no 'Kankyo Settei' Catalog & Tips 10 Sen, Mac People, ASCII Corporation, Oct. 1, 2007.
Written Opinion issued in PCT/US1122598, dated Mar. 29, 2011.
U.S. Appl. No. 61/129,637, filed Jul. 9, 2008; Dion et al.
U.S. Appl. No. 61/202,617, filed Mar. 18, 2009; Dion et al.
NPL, "Wurlitzer, One More Time CD", downloaded from https://www.flippers.com/pdfs/OMT CD_Operating&FieldService_22.pdf, dated Dec. 5, 2005 and attached as a PDF file, (Year: 2005)kortenh.

* cited by examiner

SYSTEMS AND/OR METHODS FOR MONITORING AUDIO INPUTS TO JUKEBOX DEVICES

CROSS-REFERENCES TO RELATED APPLICATIONS

This application is a continuation application of U.S. application Ser. No. 13/346,600, filed Jan. 9, 2012 and incorporates by reference the entire contents of U.S. application Ser. Nos. 12/929,466; 11/902,658; 11/902,790; 12/076,761; 61/129,637; 12/222,785; 12/318,864; and 61/202,617.

TECHNICAL FIELD

Certain exemplary embodiments relate to digital jukebox devices. More particularly, certain exemplary embodiments relate to monitoring audio inputs to jukebox devices to determine whether the jukebox devices are being used to play unlicensed media.

BACKGROUND AND SUMMARY

Jukeboxes have been around for decades and provide users with the ability to select desired music for reproduction in a convenient and advantageous manner Jukeboxes have conventionally been provided in commercial establishments, such as restaurants and bars, in order to provide desired music on demand for patrons thereof for a fee. Over the last several years, a new generation of jukebox devices have become available that provide significant improvements in the operation thereof for all parties involved. More specifically, the conventional standalone phonorecord and CD jukeboxes are being replaced by digital downloading jukeboxes that are controlled by and communicate with a central server. An example of this new generation jukebox system is shown in U.S. Pat. No. 6,308,204, the entire disclosure of which is incorporated herein by reference. A leading provider of this new generation of jukebox systems is TouchTunes Music Corporation.

FIG. 1 shows an overview of an exemplary embodiment of a digital downloading jukebox system 10 (hereinafter referred to simply as a "jukebox system"). As shown in FIG. 1, the jukebox system 10 includes a central server 12 that contains a master library of audio content (typically music), as well as or alternatively audiovisual content (typically music and associated video or graphics), that can be downloaded therefrom. The jukebox system also includes a series of remote jukebox devices 16, 16a-16f. Each of these jukebox devices are generally located in a bar, restaurant, club or other desired location, and are operable to play music in response to receiving a payment from a user, such as coins, bills, credit/debit card, etc., and having one or more songs selected by the user for play. In an alternative embodiment, a music service is paid for on a subscription basis by the location, and the selected music is free for the end-user. The jukebox device 16 typically includes a screen 18 that presents information to the user and allows the user to select songs therefrom, as well as an audio system 20 that plays the selected songs. The screen 18 may also be used for displaying song-related video or graphics. The screen 18 may also be used to display advertisements for the jukebox itself in order to attract customers thereto, to display other types of advertisements, and/or to display any other desired information.

The jukebox devices 16 (sometimes referred to as simply "jukeboxes" herein) are operable to communicate with the central server 12 through a communications network 14, such as, for example, the Internet. The jukeboxes 16 periodically communicate with the server 12 in order to provide information to the server 12 regarding the specific songs that have been played on the jukebox. The central server then uses this information in order to determine the appropriate royalties and/or other payments that are owed for songs played on each jukebox. Thus, one advantage of this new generation of jukeboxes is that the sound reproduction and/or other applicable music rights can be adhered to in a more accurate and reliable manner, thereby assuring the proper royalties are paid to the artists or music owners. The central server 12 can also provide new songs to the jukebox 16 in order to assure that the appropriate or most popular songs are maintained on the jukebox based on the specific customers at that location. Thus, the songs available on each jukebox can be customized through communication with the central server in order to provide the songs and/or types of music that customers generally request at each jukebox location. As described in the above-referenced U.S. Pat. No. 6,308,204, the central server can also advantageously be used to update the operating software on the jukeboxes in order to, for example, change the operation of the jukebox, such as to provide new or improved features. Thus, another advantage of this new generation of jukeboxes is that the songs (or other audio and/or visual content), and the operation of the jukebox itself can be remotely changed as desired without the need to have someone (such as a routeman) personally service the jukebox. Instead, such updates can be done using the central server 12.

As indicated above, the jukebox devices 16 each include a mass storage device, such as a hard drive, which stores the songs and associated video/graphics data (if any), as well as any other desired graphical information for reproduction on the jukebox. The mass storage device of the jukebox typically has limited storage capacity relative to the storage device of the central server 12. As a result, only a fraction of the songs stored on the central server are typically stored on the mass storage device of the jukebox at any one time. There may be other reasons as well, such as for security of the data or limited room in the jukebox itself, for having limited storage capacity on the jukebox and/or limiting the number of songs stored thereon. For example, physical space may be limited on wall-mount jukeboxes or the like, which are designed to be small in size as compared to free-standing models. As explained above, the songs on the jukebox can be changed through communication with the central server, but typically any one jukebox only stores a relatively small subset of the complete library of songs maintained by the central server at any one time.

As is known in the art, today's bar and restaurant market typically is served by independent small businesses known as operators. These operators typically purchase audio, video, gaming, and/or other equipment from manufacturers for installation in a variety of public, out-of-home locations.

Although the terms of the setup vary, this equipment is typically provided to the location by the operator at no cost for some period of time. When a certain amount of equipment cost has been recouped, the operator will then share revenue generated by the equipment with the location. Revenue may be generated via customers or patrons of the location paying for plays on the jukebox, etc. Similar to the above, the precise terms of this revenue split generally are negotiated independently.

The audio equipment installed in a location may include, for example, a digital jukebox, external amplification, one or more zones of audio, professional grade speakers and/or speaker systems, and sometimes even lighting. These components may be connected via a custom-installed wiring system in some locations. In addition, some locations install table- or counter-top gaming units that also serve as music terminals to operate the jukebox. These gaming units may be fixed to a location (e.g., a bar, table, etc.) or movable within the location (e.g., after being released from a tower or the like). Today's on-location audio, video, and gaming equipment oftentimes incorporates a substantially persistent Internet connection. This connection is often paid for by the operator.

In view of the foregoing description of a typical setup at a location, it will be appreciated that operators often make significant investments with respect to the locations they manage. And as alluded to above, this investment typically is made with the expectation that pay-for-play revenue for the use of the equipment will provide a fair return over some period of time.

The fees that are collected by the operator are subject to a charge from the jukebox music network provider. This charge is used to pay for the service availability. This charge also is used to pay for royalty payments for the public performance of the songs. In other words, jukebox music operators obtain special public performance rights and mechanical reproduction rights for the music they offer for playback on and/or via their systems.

It will be appreciated that these rights (e.g., for operators) are different from those associated with consumer music services such as iTunes. For instance, iTunes and services like it sell or license music for personal use. Thus, a song purchased from iTunes or Amazon may not be used for a public performance in a commercial establishment. As also will be appreciated, personal or home use is different from public performance use, and the rights implicated are correspondingly different, both as a matter of practical convenience and as a matter of national and international copyright laws.

A recent trend in some venues involves providing multiple televisions or other displays throughout the particular location. For instance, multiple flat screen televisions often are used for watching sports in a venue. Because of the proliferation of multiple displays external to the jukebox for displaying jukebox-related and/or other media, a need has arisen for digital jukebox systems to include an auxiliary input. Such an auxiliary input may be used to distribute the audio signal from a television or other broadcast through the audio system installed by the operator, for example. This has come to be a customary and generally acceptable use of the operator-installed equipment on the part of the venue, with a related understanding being that showing the local teams' games may serve as an attraction for patrons and may only occupy a couple of hours of the evening during which the jukebox may not be operational as a pay-for-play system anyway (e.g., because of the sporting even being shown and occupying people's attentions).

A more troubling trend, however, relates to bartender- or other user-supplied audio. The inventors of the instant invention have observed this as a growing trend over the past few years. More particularly, the inventors of the instant invention have noticed that bartenders and occasionally owners are providing iPods or portable music playing devices filled with consumer licensed or unlicensed music files. This music is then connected to the auxiliary audio input of the house sound system.

One disadvantageous result of using the auxiliary audio input in this way is that artists are not being compensated for the music being played publicly. In other words, there is a violation of the public performance right of music licensed only for private or home use. Another disadvantageous result is that the operator loses the opportunity for revenue, despite the fact that it is the operator's own equipment that is being used to entertain the patrons.

Unfortunately, the misuse of the auxiliary audio input has become a serious problem for the operator community. Indeed, the operator community has not had a viable way to determine whether the auxiliary input is or was being used for television or for some undetermined music source, much less what the rights associated with the music source are. It also follows that the operator community has been unable to track these problems, looking for trends and trying to track down the "guilty" parties.

Thus, it will be appreciated that there is a need in the art to overcome these and/or other related issues, e.g., for operators, copyright owners, and potentially location managers or owners who might incur vicarious liability for the copyright abuses of their employees or others.

One aspect of certain exemplary embodiments relates to techniques for monitoring the audio signal(s) being provided to a digital jukebox system or house audio system.

Another aspect of certain exemplary embodiments relates to capturing segments of the audio stream(s) and matching the audio stream(s) against music files by means of a music fingerprint or watermarking algorithm, or the like.

Still another aspect of certain exemplary embodiments relates to tracking violations and optionally taking corrective action such as, for example, notifying an operator, alerting copyright enforcement personnel, temporarily or permanently disabling a feature of a digital jukebox system or house audio system or the entirety of such systems, etc.

The recorded music industry has been damaged by the proliferation of unlicensed music. Certain exemplary embodiments, however, provide monitoring techniques that may help to protect the operator and the operator's public performance music licensing revenue stream from a similar fate.

In certain exemplary embodiments, a method for detecting unlicensed music on a digital jukebox device is provided. It is determined whether audio is being provided to the digital jukebox device from an external source for reproduction via a speaker system connected to the jukebox device in place of jukebox media available directly to the jukebox device. When the determining indicates that audio is being provided to the digital jukebox device from the external source for reproduction via the speaker system: (a) at least a portion of the audio being provided to the digital jukebox device from the external source for reproduction via the jukebox device is captured; (b) it is detected whether the captured portion corresponds to audio content that should be licensed; and (c) a log of possible license violations is updated when the detecting indicates that the captured portion corresponds to audio content that should be licensed. A notification concerning the log of possible violations is generated when a number of possible violations meets or exceeds a predetermined threshold in a predetermined time period.

In certain exemplary embodiments, a non-transitory computer-readable storage medium tangibly stores instructions that, when executed by a processor of an electronic device deployed in a digital jukebox system, perform the above-described and/or other methods.

In certain exemplary embodiments, a digital jukebox device is provided. At least one processor is provided. A media catalog stores a plurality of instances of media available for playback via the jukebox device. A user interface is configured to enable a user to cause an instance of media to be played by the jukebox device upon receipt of a fee. An output is connectable to at least one speaker system. An input is connectable to an external source of audio. A monitor subsystem is configured to detect whether unlicensed music is being played on the jukebox device. The monitor subsystem is further configured to work with the at least one processor to determine whether audio is being provided to the digital jukebox device from an external source for reproduction on the jukebox device in place of instances of media from the media catalog. When the determining indicates that audio is being provided to the digital jukebox device from the external source for reproduction via the speaker system, it is further configured to capture at least a portion of the audio being provided to the digital jukebox device from the external source for reproduction via the jukebox device, detect whether the captured portion corresponds to audio content that should be licensed, and update a log of possible license violations when the detecting indicates that the captured portion corresponds to audio content that should be licensed. It also may generate a notification concerning the log of possible violations when a number of possible violations meets or exceeds a predetermined threshold in a predetermined time period.

The exemplary embodiments, aspects, and advantages disclosed herein may be provided in any suitable combination or sub-combination to achieve yet further exemplary embodiments.

BRIEF DESCRIPTION OF THE DRAWINGS

These and other features, aspects, and advantages of the instant invention will be further understood by review of the following detailed description of the exemplary embodiments when read in conjunction with the appended drawings, in which.

DETAILED DESCRIPTION OF EXEMPLARY EMBODIMENTS

Certain exemplary embodiments relate to techniques for monitoring the audio signal(s) being provided to digital jukebox systems and/or house audio systems. In certain exemplary embodiments, the monitor system may periodically or randomly capture segments of the audio stream. These segments may be matched against music files, e.g., using a music fingerprint or watermarking algorithm. In certain exemplary embodiments, the segments may themselves be searched or examined for evidence of digital watermarks, encryption, or other identifying information. If the system determines that the audio segment captured appears to be from a recorded music file, log of likely violations may be updated (e.g., a log file, files, database, etc., may be maintained on a suitable non-transitory computer readable storage medium, a central server, etc.). Once a number of likely violations have been logged, corrective action may be taken. Corrective actions may include some or all of, for example, notifying an operator, alerting copyright enforcement personnel, temporarily or permanently disabling a feature of a digital jukebox system or house audio system or the entirety of such systems, and/or the like.

Figure 1:
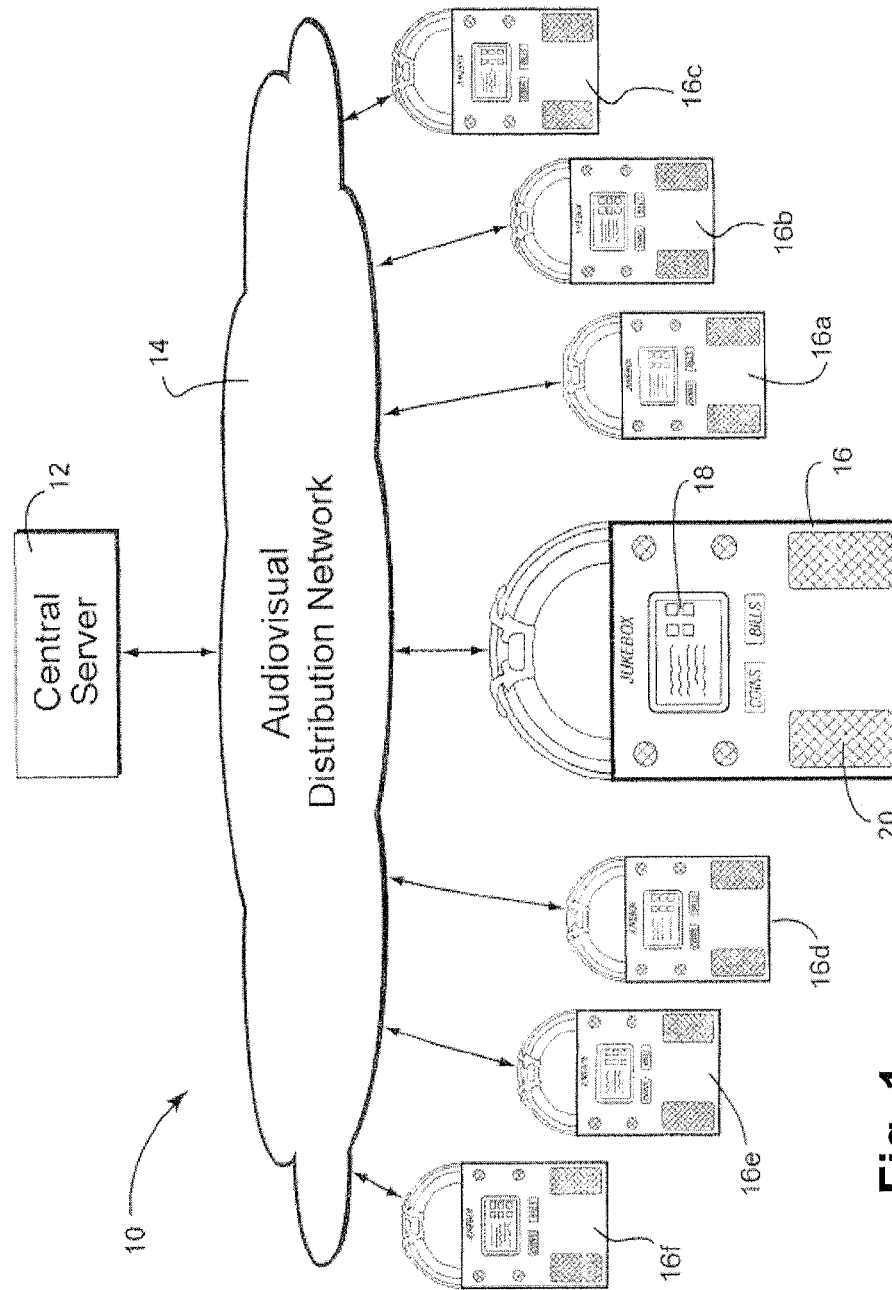
FIG. 1 is a block diagram of a conventional downloading digital jukebox system.
Figure 2:
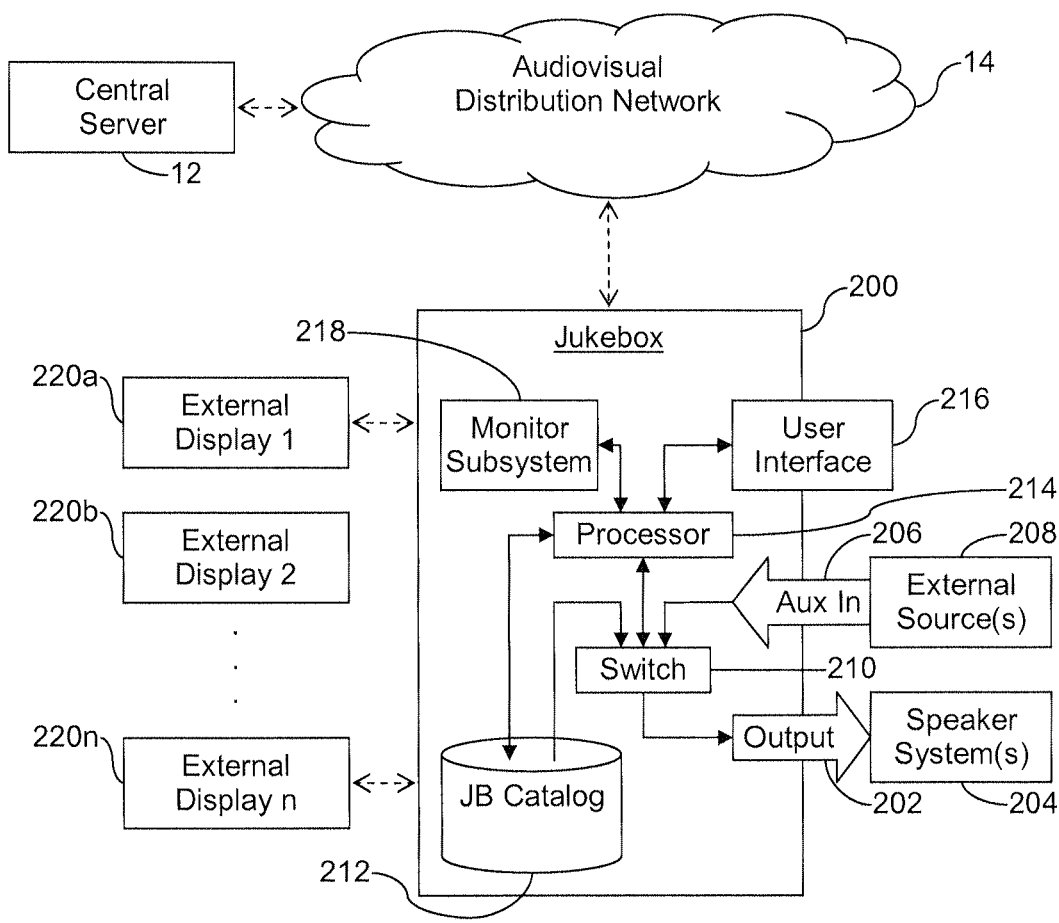
FIG. 2 is a block diagram of a digital jukebox device provided with a monitor subsystem in accordance with certain exemplary embodiments.

Referring now more particularly to the drawings, FIG. 2 is a block diagram of a digital jukebox device provided with a monitor subsystem in accordance with certain exemplary embodiments. As shown in FIG. 2, an improved jukebox device is connected to a central server 12 via an audiovisual distribution network 14. One or more displays 220 may be provided external to the jukebox 200. Some or all of these displays may be connected to and/or under the control of the jukebox 200. In certain exemplary embodiments, the external displays 220 may be responsible for displaying advertisements, television or other media, remote jukebox user interfaces, attract or flight media, etc. In any event, one or more outputs 202 may be provided to the jukebox 200 so that the jukebox can be connected to speaker system(s) 204. One or more auxiliary inputs 206 may be configured to accept audio and/or other input from external source(s) 208. External sources may be, for example, an audio stream from a television or other broadcast, a radio, a microphone, a connected electronic device (such as, for example, a media player), and/or the like. A switch 210 may help determine whether and which audio from the external source(s) 208 fed into the jukebox 200 via the auxiliary inputs 206 is to be played, or whether items from the jukebox catalog 212 are to be played via the speaker system(s) 204. The switch 210 may be at least partially controlled by a processor of the jukebox 200. The processor 214 also may coordinate operation of the jukebox 200, e.g., in response to user inputs received, for example, via the user interface 216. Example user interfaces, revenue-generating features, and other related operational and attract mode techniques are described, for example, in U.S. application Ser. No. 12/929,466, the entire contents of which are hereby incorporated herein by reference.

A monitor subsystem 218 also may be provided to the jukebox 200 in certain exemplary embodiments. Although the monitor subsystem 218 in FIG. 2 is shown as being a component of the jukebox 200, the monitor subsystem 218 may be a standalone component in certain exemplary embodiments. The monitor subsystem 218 may, for example, determine when the auxiliary input 206 is in use, e.g., by receiving a signal from the processor 214. In such cases, the monitor subsystem 218 may temporarily store one or more portions of the incoming stream of audio data. The stream may be captured at regular or irregular (e.g., random) intervals for analysis purposes.

The determination as to whether the captured media likely comes from an unlicensed source may be performed in any suitable manner. For example, the portions of the captured stream may simply be scanned to determine whether they already include a digital watermark, encrypted or other tag, etc. As another example, the captured portion may be forwarded to a service configured to run a fingerprint or watermark algorithm on the captured data, with the service being stored and/or executed locally or at a remote location. The fingerprint or watermark may be compared to a database of songs to identify likely matches. In certain exemplary embodiments, the monitor subsystem 218 may compare the captured portions against the media stored in the jukebox catalog 212 on the jukebox 200, against the master catalog accessible by the central server 12 via the audiovisual distribution network 14, or some other media.

The monitor subsystem 218 may attempt to capture entire songs to aid with the determination as to whether captured media likely comes from an unlicensed source. Known techniques may be implemented in this regard including, for example, monitoring for periods of low or no sound that often are present at the beginnings and ends of songs, etc. In certain exemplary embodiments, large parts of the incoming stream or the entire stream may be captured, likely song candidates separated, and then processed one-by-one or in batch.

Of course, music is prevalent in television broadcasts today and so a single instance of recorded music being observed would not necessarily indicate public performance of unlicensed music. Thus, the monitor system 218 may be configured to maintain a count of the number of likely violations over a specific period of time. If the number of likely violations over a predetermined time window exceeds a predefined threshold, an auxiliary input music violation alert may be generated.

To aid in the analysis, the monitor subsystem 218 may attempt to discern patterns in the likely violations. The ability to discern patterns such as, for example, a common item being played at nearly the same time daily might suggest a limited violation. As another example, violations detected during known sporting events might suggest a lack of any violation. The ability to detect patterns also may be advantageous in that information relating to times of day, days of week, etc., might make it easier for an operator to surreptitiously or otherwise investigate a situation (including, for example, staff members or managers on duty, etc.).

Likely music violations may be communicated to the operator as they occur (e.g., substantially in real time) through an email gateway, automated voice call, SMS or other text message, etc., e.g., by utilizing the audiovisual distribution network 14 and/or the location's Internet connection. In certain scenarios, violations may be reported only when they exceed the predetermined threshold. Optionally, the actual music tracks that were matched could be listened to in substantially real time or at a later point in time at the location or from a remote site. This may be accomplished by streaming the data out over the audiovisual distribution network, storing and/or compressing the music and saving it to a non-transitory storage location of the jukebox 200 or other non-transitory storage location accessible by the operator, etc.

Log files of likely violations may be maintained and/or sent to the operator in a similar fashion. The log files may include the dates/times of the violations, the suspected music match, information regarding when the auxiliary mode was entered and/or ceased, information about the location personnel who entered into the auxiliary mode (if known), etc. Information uniquely identifying the location and/or the jukebox(es) with the location also may be provided in the log file. The may be advantageous when a single location includes a jukebox with multiple auxiliary inputs, when a single location includes multiple jukeboxes, when an operator manages multiple locations, and/or in other scenarios. Pattern information similar to that identified above also may be logged in the same or a similar manner and made available to the operator.

By providing these and/or other types of information, the operator may be better information as to the situation within a location, potentially allowing the operator to discuss the situation with the location owner. An example interest of the operator is to ensure that the music played within the location and over the operator's equipment is (1) legal or licensed and (2) under some pay-for-play arrangement. Digital jukebox systems offer single song or background music services based on legal licensed content. In certain scenarios, locations may agree to forgo their portable music player devices or alternate music sources for legal, paid-for music. If an operator is unable to persuade the location owner to stop abuse of the auxiliary input, the operator may have a reasonable position for disabling the input, altering the revenue split, removing or altering the installed equipment, terminating a contract or agreement, etc.

Figure 3:
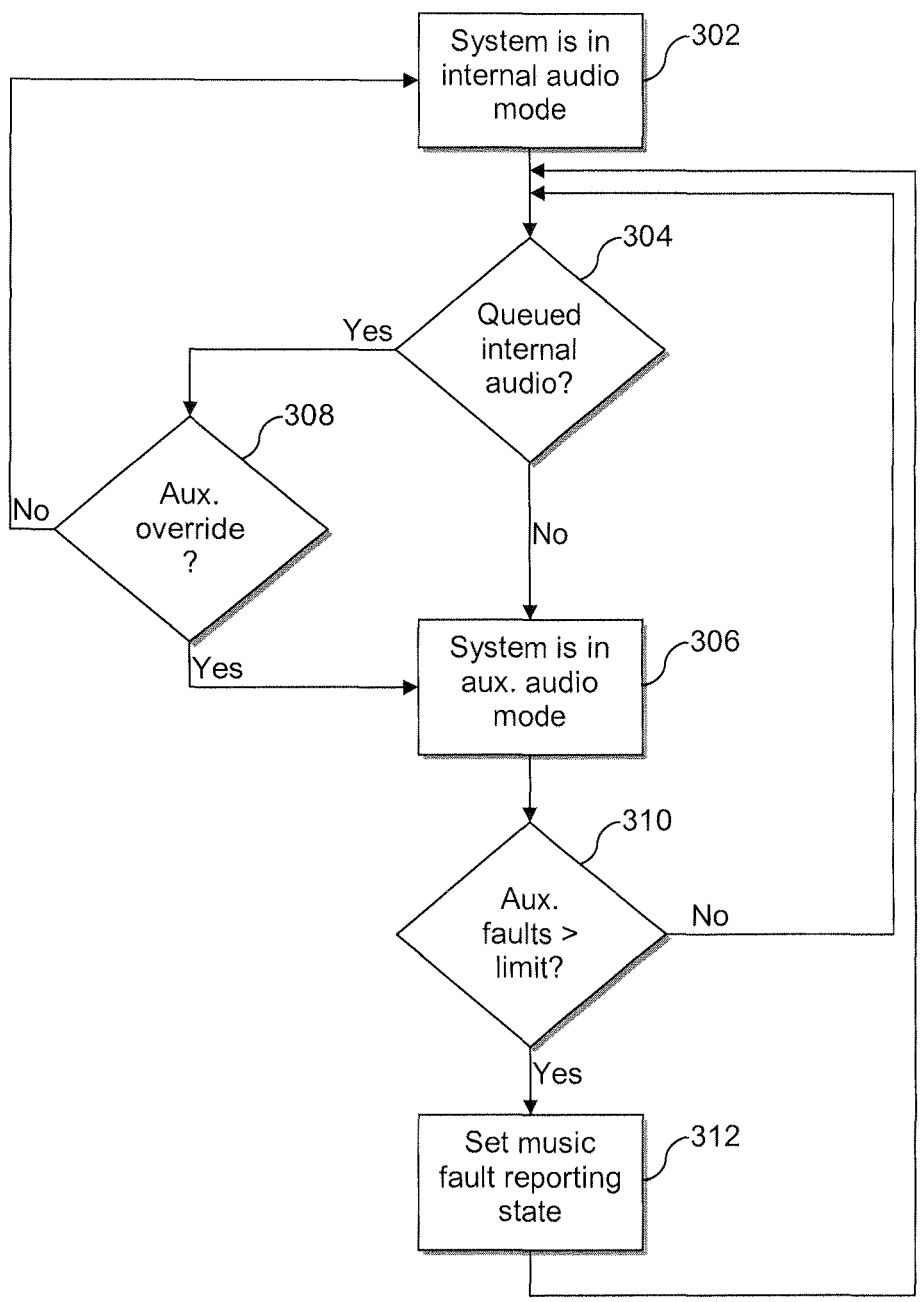
FIG. 3 is an illustrative audio source switching state diagram in accordance with certain exemplary embodiments.

FIG. 3 is an illustrative audio source switching state diagram in accordance with certain exemplary embodiments. Assume, for example, that the jukebox starts in the internal audio mode (302). A check is performed to determine whether there is queued internal audio (304). If there is queued internal audio, a second check is made to determine whether the auxiliary override feature is enabled (308). If the auxiliary override feature is not enabled, then the system is in the internal audio mode (302). If, however, there is no queued internal audio, or there is queued internal audio but the auxiliary override feature is enabled, then the system may be in the auxiliary audio mode (306). In such a case, a determination is made as to whether the number of auxiliary faults exceeds a predetermined limit or threshold (310). If so, then the music fault reporting aspect of the monitoring system may be turned on (312). It will be appreciated that live or substantially live notifications may be sent (e.g., to the operator, bar personnel or managers, etc.) and/or that other actions may be taken such as, for example, temporarily disabling the auxiliary input, displaying a message on the screen that unlicensed music has been detected, and/or the like. Notifications thus may be sent with each possible violation, periodically (e.g., daily, weekly, etc.), upon a triggering event (e.g., the predetermined threshold being met or exceeded, upon a specific request from an operator, etc.). The actions may be taken in response to a response to remote command from operator, automatically by system, and/or the like, in different exemplary embodiments. After that, or in the event that the limit is not exceeded, checks to determine the audio mode may again be made, beginning with the determination as to whether the jukebox has queued internal audio (304) and in accordance with the above.

Figure 4:
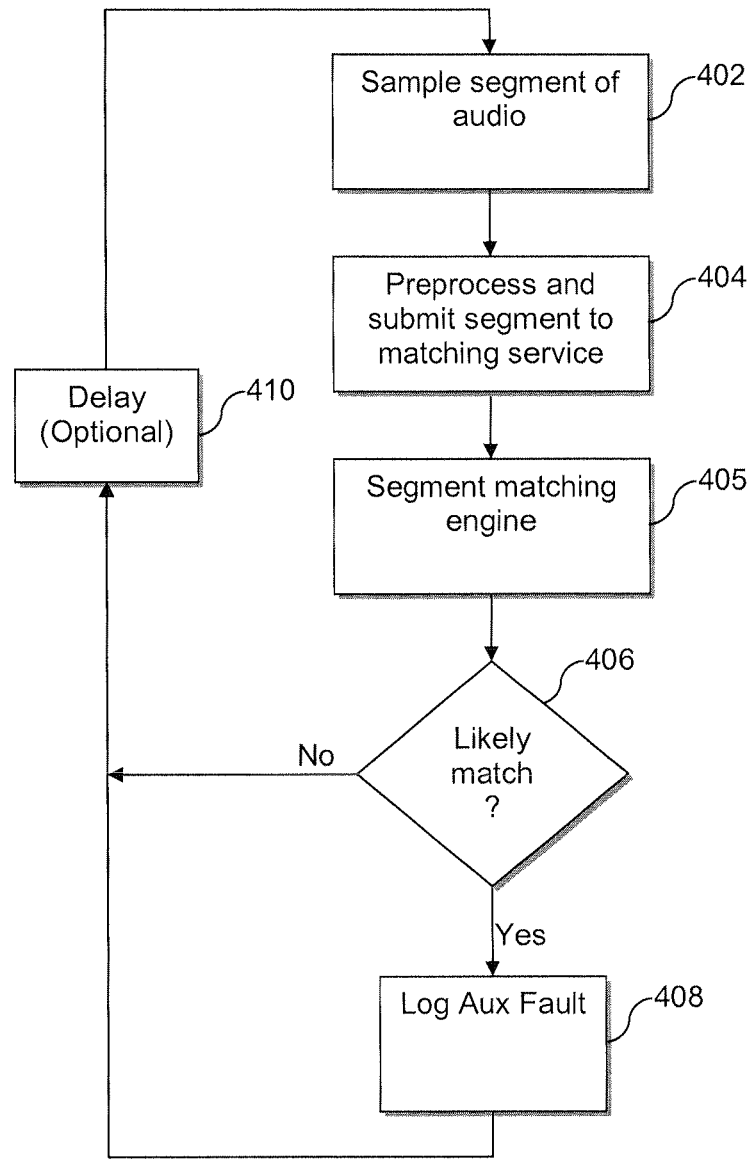
FIG. 4 is an illustrative auxiliary audio mode state diagram in accordance with certain exemplary embodiments.

FIG. 4 is an illustrative auxiliary audio mode state diagram in accordance with certain exemplary embodiments. A segment of audio is sampled (402), and the segment undergoes pre-processing before it is submitted to the matching service (404). The pre-processing may include, for example, extraction from a larger stream, temporary or more permanent storage on a non-transitory computer readable storage medium, filtering (e.g., to compensate for noise caused by the input for example), etc. The segment machine engine operates (405) on the submitted segment. A determination is made as to whether there is a likely match (406). If there is a likely match, the fault is logged (408). Thereafter, or in the event that there is no likely match, then an optional delay is imposed (410) before another segment of audio is sampled (402).

Figure 5:
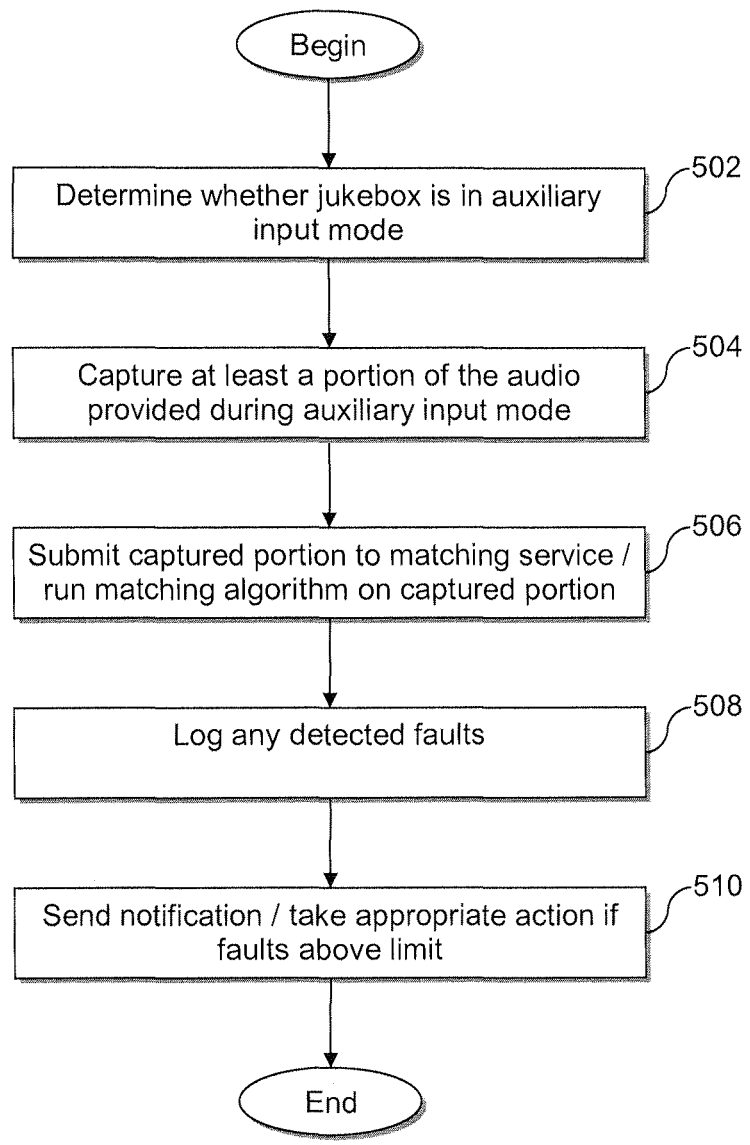
FIG. 5 is a flowchart illustrating an example process for monitoring a digital jukebox devices' auxiliary audio input in accordance with certain exemplary embodiments.

FIG. 5 is a flowchart illustrating an example process for monitoring a digital jukebox devices' auxiliary audio input in accordance with certain exemplary embodiments. In step 502, it is determined whether the jukebox is in auxiliary input mode. A technique similar to that described above in connection with FIG. 3 may be used in certain exemplary embodiments. At least a portion of the audio provided during the auxiliary input mode is captured in step 504. The captured portion is submitted to a matching service and/or a matching algorithm is run on the captured portion in step 506. Any detected faults are logged in step 508. In step 510, notifications are sent and/or appropriate actions (e.g., as described above) may be taken if the number of faults exceeds a predefined limit.

The present disclosure has used certain terms that should not be interpreted as limiting the invention to a particular embodiment, hardware components and configurations, software configurations, etc. For example, features and examples have been described in relation to their existence within a bar, pub, or other environment. However, it will be appreciated that the features present in the exemplary embodiments of the present invention are adaptable for use in any location where a jukebox (or multiple jukeboxes) may be located. Similarly, while certain features and functions are described with reference to usage by "users," "owners," "operators," "patrons," etc., it will be appreciated that these terms are generic and may, in most cases, be used interchangeably depending on the embodiment chosen and the feature employed. For example, while it may be advantageous to limit the initial song selection to owners and/or operators, in certain exemplary embodiments, patrons may play a role in the initial song selection. It will be appreciated that the term "display" includes, for example, monitors connected to computers directly or remotely, or embedded ICs such as IP TV technology. Displays may be network addressable. Also, standard digital signs (LED based) also may be considered displays and/or may be provided as network addressable displays.

Although certain exemplary embodiments have been described in connection with out-of-home locations, it will be appreciated that the techniques described herein may be adapted for use in an in-home or personal jukebox.

Still further, particular hardware combinations and configurations are disclosed which represent only one way which the embodiments may be constructed. Central servers may, in some exemplary embodiments, be comprised of one or more servers acting together or separately to coherently provide the full range of services necessary to enable a functioning jukebox. For example, a cluster of servers may comprise a virtual central server, with one server providing media, another tracking membership, still another processing licensing, etc.

Similarly, local servers may be incorporated into the jukeboxes. For example, the local servers may appear to function independently, even though they exist as part (e.g. partition) of an integrated mass storage device within the jukebox. Indeed, as hard disks become larger and less expensive, they may preferably serve the functions of local servers.

Also, although the term "song" has been used sometimes in the above-description, this term is not intended to be limiting to the scope of the invention, and any instance or instances of media (e.g., song, video, song/video combination, data, information etc.) can be used in any embodiment herein and still fall within the intended scope of the invention.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A method for detecting unlicensed music being played on a digital jukebox device, comprising:
   starting the digital jukebox device in an internal audio mode in which internal jukebox media is reproduced by the jukebox device;
   determining whether there is queued internal audio in the digital jukebox device;
   determining whether an auxiliary override feature is enabled, wherein, when the auxiliary override feature is enabled, the digital jukebox device is configured to receive an audio stream from an external source and reproduce the audio stream;
   in response to the determination that there is queued internal audio and the determination that the auxiliary override feature is not enabled, operating the jukebox device in the internal audio mode;
   in response to the determination that there is no queued internal audio or the determination that the auxiliary override feature is enabled, changing the jukebox to operate in an auxiliary audio mode in which the audio stream from an external source is being provided to the digital jukebox device for reproduction via a speaker system connected to the digital jukebox device;
   in response to the changing the digital jukebox device to operate in the auxiliary audio mode:
   determining whether at least a portion of the audio stream corresponds to audio content that should be licensed after determining that the audio stream is being provided to the digital jukebox device from the external source for reproduction via the digital jukebox device;
   updating a log of possible license violations upon determining that the portion of the audio stream corresponds to the audio content that should be licensed;
   determining whether a number of possible violations meets or exceeds a predetermined threshold in a predetermined time period; and
   in response to the determination that the number of possible violations meets or exceeds the predetermined threshold in the predetermined time period, disabling an audio input of the digital jukebox device, wherein an audio stream from the external source is provided through the audio input.

2. The method of claim 1, wherein the updating the log of possible license violations comprises logging a date and time of each possible license violation in the log.

3. The method of claim 2, wherein the updating the log of possible license violations comprises logging an indication of a song or songs suspected to be associated with each possible license violation in the log.

4. The method of claim 1, further comprising electronically sending the notification to an operator responsible for the digital jukebox device.

5. The method of claim 1, further comprising searching for patterns in the log of possible license violations.

6. The method of claim 1, wherein the determining whether at least a portion of the audio stream corresponds to audio content that should be licensed comprises:
   capturing the portion of the audio stream after determining that the audio stream is being provided to the digital jukebox device from the external source for reproduction via the digital jukebox device; and
   determining whether the captured portion of the audio stream corresponds to audio content that should be licensed.

7. The method of claim 6, wherein the capturing is performed at a plurality of times.

8. The method of claim 7, wherein the capturing is performed at random intervals.

9. The method of claim 7, further comprising waiting a predetermined amount of time between successive capture operations.

10. The method of claim 1, further comprising automatically identifying a suspected beginning and/or an ending of a selection.

11. A non-transitory computer-readable storage medium tangibly storing instructions that, when executed by a processor of a digital jukebox device deployed in a digital jukebox system, causes the processor to perform a method comprising:
   starting the digital jukebox device in an internal audio mode, in which internal jukebox media is being reproduced by the digital jukebox device;
   determining whether there is queued internal audio in the digital jukebox device;
   determining whether an auxiliary override feature is enabled, wherein, when the auxiliary override feature is enabled, the digital jukebox device is configured to receive an audio stream from an external source and reproduce the audio stream;
   in response to the determination that there is queued internal audio and the determination that the auxiliary override feature is not enabled, operating the digital jukebox device in the internal audio mode;
   in response to the determination that there is no queued internal audio or the determination that the auxiliary override feature is enabled, changing the jukebox to operate in an auxiliary audio mode, in which the audio stream from an external source being provided to the digital jukebox device for reproduction via a speaker system connected to the digital jukebox device;
   in response to the changing the digital jukebox device to operate in the auxiliary audio mode:
   determining whether at least a portion of the audio stream corresponds to audio content that should be licensed after determining that the audio stream is being provided to the digital jukebox device from the external source for reproduction via the digital jukebox device;
   updating a log of possible license violations when the detecting indicates that the portion of the audio stream corresponds to the audio content that should be licensed;
   determining whether a number of possible violations meets or exceeds a predetermined threshold in a predetermined time period; and
   in response to the determination that the number of possible violations meets or exceeds the predetermined threshold in the predetermined time period, disabling an audio input of the digital jukebox device, wherein an audio stream from the external source is provided through the audio input.

12. The non-transitory computer-readable storage medium of claim 11, wherein the updating the log of possible license violations comprises logging a date and time of each possible license violation in the log.

13. The non-transitory computer-readable storage medium of claim 12, wherein the updating the log of possible license violations comprises logging an indication of a song or songs suspected to be associated with each possible license violation in the log.

14. The non-transitory computer-readable storage medium of claim 11, wherein the instructions further cause the processor to perform electronically sending the notification to an operator responsible for the digital jukebox device.

15. The non-transitory computer-readable storage medium of claim 11, wherein the instructions further cause the processor to perform searching for patterns in the log of possible license violations.

16. The non-transitory computer-readable storage medium of claim 11, wherein the determining whether at least a portion of the audio stream corresponds to audio content that should be licensed comprises:
   capturing the portion of the audio stream after determining that the audio stream is being provided to the digital jukebox device from the external source for reproduction via the digital jukebox device; and
   determining whether the captured portion of the audio stream corresponds to audio content that should be licensed.

17. The non-transitory computer-readable storage medium of claim 16, wherein the portion of the audio stream is captured at a plurality of times.

18. The non-transitory computer-readable storage medium of claim 17, wherein the portion of the audio stream is captured at random intervals.

19. The non-transitory computer-readable storage medium of claim 17, wherein the instructions further cause the processor to perform waiting a predetermined amount of time between successive capture operations.

20. The non-transitory computer-readable storage medium of claim 11, wherein the instructions further cause the processor to perform automatically identifying a suspected beginning and/or an ending of a selection.

21. A digital jukebox device for detecting unlicensed music being played on the digital jukebox device, comprising:
   at least one processor;
   a non-transitory storage medium storing a plurality of instances of media available for playback via the digital jukebox device;
   a user interface, the user interface accepting a selection of an instance of media;
   an audio output connectable to at least one speaker system; and
   an audio input, an audio stream from an external source being provided through the audio input;
   wherein the digital jukebox device is configured to at least:
   start the digital jukebox device in an internal audio mode, in which internal jukebox media is being reproduced by the digital jukebox device;
   determine whether there is queued internal audio in the digital jukebox device;
   determine whether an auxiliary override feature is enabled, wherein, when the auxiliary override feature is enabled, the digital jukebox device is configured to receive an audio stream from an external source and reproduce the audio stream;
   in response to the determination that there is queued internal audio and the determination that the auxiliary override feature is not enabled, operate the digital jukebox device in the internal audio mode;
   in response to the determination that there is no queued internal audio or the determination that the auxiliary override feature is enabled, change the jukebox to operate in an auxiliary audio mode, in which the audio stream from an external source being provided to the digital jukebox device for reproduction via a speaker system connected to the digital jukebox device;

in response to the changing the digital jukebox device to operate in the auxiliary audio mode:

determine whether at least a portion of the audio stream corresponds to audio content that should be licensed after determining that the audio stream is being provided to the digital jukebox device from the external source for reproduction via the digital jukebox device, update a log of possible license violations when the detecting indicates that the captured portion of the audio stream corresponds to the audio content that should be licensed, determine whether a number of possible violations meets or exceeds a predetermined threshold in a predetermined time period; and in response to the determination that the number of possible violations meets or exceeds the predetermined threshold in the predetermined time period, disabling an audio input of the digital jukebox device, wherein an audio stream from the external source is provided through the audio input.

22. The digital jukebox device of claim 21, wherein the updating the log of possible license violations comprises logging a date and time of each possible license violation in the log.

23. The digital jukebox device of claim 22, wherein the updating the log of possible license violations comprises logging an indication of a song or songs suspected to be associated with each possible license violation in the log.

24. The digital jukebox device of claim 21, wherein the at least one processor is further configured to control the digital jukebox device to at least electronically send the notification to an operator responsible for the digital jukebox device.

25. The digital jukebox device of claim 21, wherein the at least one processor is further configured to control the digital jukebox device to at least search for patterns in the log of possible license violations.

26. The digital jukebox device of claim 21, wherein the at least one processor is further configured to control the digital jukebox device to at least automatically identify a suspected beginning and/or an ending of a selection.

* * * * *